(12) United States Patent
Drury et al.

(10) Patent No.: US 6,912,270 B1
(45) Date of Patent: Jun. 28, 2005

(54) COMMUNICATIONS SYSTEM

(75) Inventors: Ian R Drury, Newport (GB); Beatrice H. A Butsana-Sita, London (GB); Anthony M Brown, Purley (GB); Seamus A Bridgeman, Newtownmountkennedy (IL)

(73) Assignee: British Telecommunications public limited company, London (GB)

( * ) Notice: Subject to any disclaimer, the term of this patent is extended or adjusted under 35 U.S.C. 154(b) by 0 days.

(21) Appl. No.: 09/284,015

(22) PCT Filed: Oct. 30, 1996

(86) PCT No.: PCT/GB96/02646

§ 371 (c)(1),
(2), (4) Date: Apr. 6, 1999

(87) PCT Pub. No.: WO98/19282

PCT Pub. Date: May 7, 1998

(30) Foreign Application Priority Data

Oct. 30, 1996 (GB) ............................................. 9622644

(51) Int. Cl.[7] .......................... H04M 11/04; H04M 1/64
(52) U.S. Cl. ............................. 379/51; 379/40; 379/41; 379/69; 379/87
(58) Field of Search ............................ 379/37, 40, 41, 379/42, 265.02, 67, 22.03, 69, 87, 51

(56) References Cited

U.S. PATENT DOCUMENTS

| | | | |
|---|---|---|---|
| 5,032,989 A | * | 7/1991 | Tornetta ........................ 705/1 |
| 5,121,420 A | * | 6/1992 | Marr et al. .................. 324/533 |
| 5,121,430 A | | 6/1992 | Ganzer et al. |
| 5,559,867 A | * | 9/1996 | Langsenkamp et al. ....... 379/69 |
| 5,812,644 A | * | 9/1998 | Bowater et al. ......... 379/93.06 |
| 6,021,177 A | * | 2/2000 | Allport ........................ 379/42 |

FOREIGN PATENT DOCUMENTS

| | | |
|---|---|---|
| DE | 27 17 177 A | 11/1978 |
| JP | 06-291870 | * 10/1994 |
| JP | 06291870 | * 10/1994 |
| WO | WO 92 08309 A | 5/1992 |

OTHER PUBLICATIONS

Database WPI Week 9718 Derwent Publications Ltd., London, GB; AN 97–193339 XP002033843 & CA 2 153 096 A (New Brunswick Telephone Co.) Dec. 31, 1996 see abstract.

* cited by examiner

Primary Examiner—Fan Tsang
Assistant Examiner—Simon P. Sing
(74) Attorney, Agent, or Firm—Nixon & Vanderhye P.C.

(57) ABSTRACT

A message distribution system for distributing a message via a telecommunications network to a plurality of communications terminals comprises: a message unit for contacting each of the terminals and sending the message, memory for storing, for a plurality of said terminals, corresponding terminal address data, and storing also a plurality of geographical element data linking geographical features of a portion of the Earth with location data; input for accepting an input control signal to initiate message distribution; area designation unit to designate a geographical area within the portion of the Earth; terminal derivation unit for outputting the terminal address data of terminals for outputting the terminal address data of terminals recorded as being geographically within the area and supplying the addresses for use by the message unit.

39 Claims, 7 Drawing Sheets

| Field Name | Length | Format | Comments |
|---|---|---|---|
| Tel No | 12 | Char | Full telephone number, no hyphens, etc |
| Customer_Name | 56 | : | Residents Name |
| Organisation_Name | 56 | : | Encompasses all business types, large and small |
| Premises_No | 6 | : | |
| Premises_Name | 45 | : | House or building name |
| Sub_Premises | 28 | : | e.g Flat 2a, or shop in a mall |
| Thoroughfare_Name | 56 | : | Road or street name |
| Locality | 28 | : | A real world area, defined by Royal Mail |
| Post_Town | 28 | : | |
| County | 18 | : | |
| Postcode | 8 | : | Characters 1-4 Outcode. 5-8 Incode |
| Secondary_Phone_No | 12 | : | Mainly for Businesses |
| X_Coordinate | 6 | : | For use by helicopters apparently |
| Y_Coordinate | 6 | : | : |

COMMUNICATIONS SYSTEM

BACKGROUND OF THE INVENTION

1. Field of the Invention

This invention relates to a method and apparatus for distributing information, particularly, but not exclusively a warning of a hazard, such as a flood, to people to whom information is to be provided via a telecommunications system.

2. Description of Related Art

The task of warning people of the imminent or actual danger of a hazard, for example, warning the inhabitants of an area which is likely to suffer from flooding, has traditionally been handled by sounding local alarms such as sirens, and by word of mouth. Additionally, it is one of the duties of the police force to make checks at each property which might be affected in their jurisdiction, to ensure that all at risk are safely evacuated.

Recently in the UK the use of sirens has been stooped altogether. Additionally, where the resources made available to police forces are overstretched, the house-to-house method of checking that everyone at risk is informed of the danger cannot be relied upon as an effective warning system. This is especially true in isolated areas where many local inhabitants are difficult to reach by road or on foot.

Warning systems based on the public telephone system have been disclosed which attempt to increase the speed with which the warnings are issued, whilst reducing the manual effort required.

For example, JP 06-291870 discloses a method of alerting fire brigades and individual fire fighters to the existence of a fire. This is achieved through the implementation of an automatic telephone message delivery system, which delivers predetermined synthesised speech telephone messages to a predetermined list of recipients.

For a different purpose, GB 2227627 discloses a method of dispatching field service engineers to reported faults in industrial plants. This disclosure relies upon synthesised voice messages containing a description of the fault and its location, transmitted via the telephone network. Each fault message is communicated to the engineer who last serviced the equipment which has developed the reported fault. If the engineer is not contactable, or in the event that he fails to confirm that he will attend to the fault, the warning system attempts to contact each engineer from a predetermined list, in turn, until an engineer confirms to undertake the job.

U.S. Pat. No. 5,559,867 discloses an automated calling system in which messages may be distributed by telephone to predetermined lists of call recipients. Alternatively a rectangular area bounded by specified horizontal and vertical co-ordinates input by the user may be used to determine geographically a list of call recipients which are located in the area.

CA 2,153,096 A1 discloses a similar system to that of U.S. Pat. No. 5,559,867. In this system, the selection of call recipients is achieved by the user selecting one of a number of predetermined sub-regions.

Other warning systems such as these have also been disclosed, however, their common feature, shared by JP 06-291870 and GB 2227627, is that those organisations and/or individuals who are to be informed upon the occurrence of a certain condition are predetermined prior to the condition arising.

BRIEF SUMMARY OF THE INVENTION

Accordingly, in a first aspect, the present invention provides a message distribution system for distributing a message via a telecommunications network to a plurality of telephone terminals, comprising: a message unit for contacting each of said terminals and sending said message to each; storage means storing a geographical information database which comprises a plurality of geographical element data linking geographical features of a portion of the Earth with location data which define the position of those features, and dial numbers for a plurality of terminals and associated location data defining the position of said terminals; input means for allowing input of input location data, comprising a display control device arranged to permit a user thereof to freely select the perimeter of an area of a display as said input location data, said area corresponding to said geographical area within said portion of the Earth; and area designating means comprising a display device for displaying said geographical features of a portion of the Earth, coupled to said input means and said store means, for designating a geographical area within said portion of the Earth based on said input location data, and generating a range of delineating map parameters for that area; terminal derivation means coupled to the store means, for outputting the dial numbers of terminals recorded as being geographically within the area and supplying the numbers for use by the message unit.

In a second aspect, the present invention provides a message distribution system for distributing a message via a telecommunications network to a plurality of telephone terminals, comprising: a message unit for contacting each of said terminals and sending said message to each; store means comprising a geographical information database, storing a plurality of geographical element data linking geographical features of a portion of the Earth with location data which define the position of those features, dial numbers for a plurality of terminals and associated location data defining the position of the terminals; input means for allowing input of input location data and environmental condition data; area designation means coupled to the input means and the store means, for designating a geographical area within the portion of the Earth based on the input location data and the environmental condition data, and generating a range of delineating map parameters for that area; and terminal derivation means coupled to the store means, for outputting the dial numbers of terminals recorded as being geographically within the area and supplying the numbers for use by the message unit.

Therefore, a geographically selected set of telecommunications users may be informed of, for example, a disaster which it is predicted will affect that area. Advantageously, in this aspect of the invention an existing distribution system may be utilised that can reach the vast majority of the population.

Preferably, the required geographical area is selected on a digitised map. The selected geographical area is then translated into a range of delineating parameters, by a Geographical Information System (GIS). The delineating parameters are used in searching for the records of telecommunications users, held in a telecommunications user database, who are situated in that area. Advantageously, in the case of telephone users, such databases are compiled at the request of government organisations such as the Home Office in the United Kingdom by the telephone operator companies. Thus the maintenance of a specific database for this application is not required.

A list of telecommunications numbers corresponding to the telecommunications users in the selected area is generated from the result of the search.

Preferably, in order to increase the effectiveness of the warning, the contact list is ordered by an algorithm which causes those deemed to be at greatest risk to be called first. Such categories might include the aged, schools, those at the centre of risk areas and those furthest away from suitable escape routes or refuge points.

It is also preferable that in order to decrease the time taken to issue information to each user on the contact list, records in the list containing telecommunications numbers which do not correspond to telecommunications users that need to be contacted are deleted from the list. Such numbers in the case of the telephone system, for example, may include public telephones, freephone numbers, chat lines and subsidiary lines (for example in an organisation or company which may contain many subsidiary lines it is only necessary to communicate the information to the security desk or reception).

In order that a warning and/or other information which is to be communicated is rapidly disseminated, it is preferable that an automatic telecommunications dialling and message relaying means (an interactive speech application platform (ISAP)), is used to contact each number on the contact list. Advantageously, this allows for one person to be able to initiate and monitor thousands of calls from a personal computer connected to a telecommunications network, thus greatly reducing the overheads required.

The information which is relayed to each telephone user by the ISAP may preferably be either a recorded voice, or a textual message which is converted into a synthesised voice by the ISAP.

It is desirable that each telecommunications number dialled by the ISAP and the result of each call (for example, whether it was answered or unanswered or whether the line was engaged or out of order) is logged. In the event that the call is unanswered, engaged, or that the warning is not successfully given, the call will be requeued and reattempted at a later point in time.

Preferably, the recipient of the call is requested to acknowledge that the call has been understood or request that the message should be repeated, either by the appropriate key touch on the receiver handset or by voice command. This response is acknowledged and appropriate action is taken to replay the message or to register that the information has been successfully delivered.

It is also desirable that the results of calls made are used to compile a list of premises, or areas, for which there was no confirmation that the information was received, or understood. This list can be used by the police, for example, in order that a precautionary visit to each of the corresponding premises can be organised. It is desirable that this list is prioritised or structured for the efficient ordering of visits.

Further, it is preferable that lists of premises in the affected area corresponding to premises without a telephone or without a vehicle can also be generated in order that any evacuation required can be more efficiently planned.

Preferably, in the event that the warning relates to a flood, a prediction of how the local area will be affected by the flood is made and accordingly a list of telecommunications users that will require warning of the flood is generated to a greater degree of accuracy. Information relating to rainfall, river levels, tide and sea conditions, obtainable from climate monitoring organisations, such as the Environment Agency in the UK, may be assessed in order to predict how the water level of a chosen area will rise.

This information is input to a computer running the digitised map. The computer software calculates how the predicted rise in water level will be locally distributed, using the contour information held within the map. This process generates a resultant area or areas on the digitised map, which indicate the predicted coverage of the flood. The predicted flood areas, as before, are used as parameters in selecting which telecommunications numbers are to comprise the contact list. As previously described suitable warnings can then be generated and telecommunicated to those at risk.

Preferably, in addition to simply detecting which premises will be, or will be likely to be, submerged by the increase in water level, the "at risk" category will also include areas which have been cut off or otherwise placed at risk. For example, if the water level rises so as to cut off escape routes from a particular area, then the telecommunications numbers of users in that area will be included in the contact list.

Preferably, the object of warning people of an impending hazard can also be realised for other types of hazard such as airborne hazards; for example in the case of a gaseous emission or toxic airborne dust particles such as might occur in an industrial accident. As has been previously described certain data is input into the computer running the digitised map which calculates according to an algorithm the area which is deemed to be at risk.

In this instance, the computer operator inputs parameters which preferably comprises the origin of the hazard, an estimate of the volume of the hazardous substance emitted into the air and how the volume varies according to time. Additional information may include the local nature of the wind, for example its speed and direction, which will determine how the hazard is dispersed in the atmosphere. Thus, the shape, direction and size of the resultant plume is predicted.

In the case of an airborne hazard, the area at risk will vary in a highly time dependent manner. Therefore, the prioritised contact list which is generated will preferably include estimates of when particular areas will be exposed to a risk and also estimates for when the hazard will have dissipated.

Preferably, the interactive nature of the speech application platform allows the recipients of calls to request more information if they so desire, through entering an appropriate key press on their receiver handset, or by voice command. Alternatively, different messages may be directed to different recipients. For example, in the event that the message information concerns a natural disaster, the warning relayed may vary depending upon the degree of risk that the recipient of each call is deemed to face; those near the centre of a disaster may be advised to await emergency assistance whereas those situated at the periphery of the disaster may be advised to make their way to muster points.

Preferably, if the ISAP detects more than a preset number of unobtainable numbers in a given area a line checking operation will automatically be instigated.

The results of such a test reveal which lines are affected and at what point. The result of this operation can then be fed back to the digitised map in order that it can be graphically represented, which allows for the rapid identification and rectification of such faults: for example, whether there is a fault in the telecommunications trunk link or an exchange, or whether it is simply a collection unrelated of local line faults or telephone receiver faults. This technique allows for the rapid routine testing of local lines in an area.

Preferably, the ISAP is capable of receiving telephone calls from the general public and giving out general information concerning a given situation, particularly an emergency.

Preferably, several ISAPs are distributed over a wide area, allowing queries concerning emergencies and the like to be diverted away from the local telephone exchange where the emergency occurred. This will result in the reduction of blockages in the local exchange which will free up the local telephone network for emergency call traffic.

Preferably, the invention can be used to supply non-warning type information. For example, it may be used by local authorities to announce their intentions to embark upon a new road building project, or by an electricity distribution company in order to announce a future power cut, or by a marketing arm of a company which intends to set up business in a particular area and is interested in the views of those who live there.

BRIEF DESCRIPTION OF THE DRAWINGS

Embodiments of the invention will now be described in greater detail by way of example only, with reference to the accompany drawings in which.

DESCRIPTION OF EXEMPLARY EMBODIMENTS

First Embodiment

Figure 1:
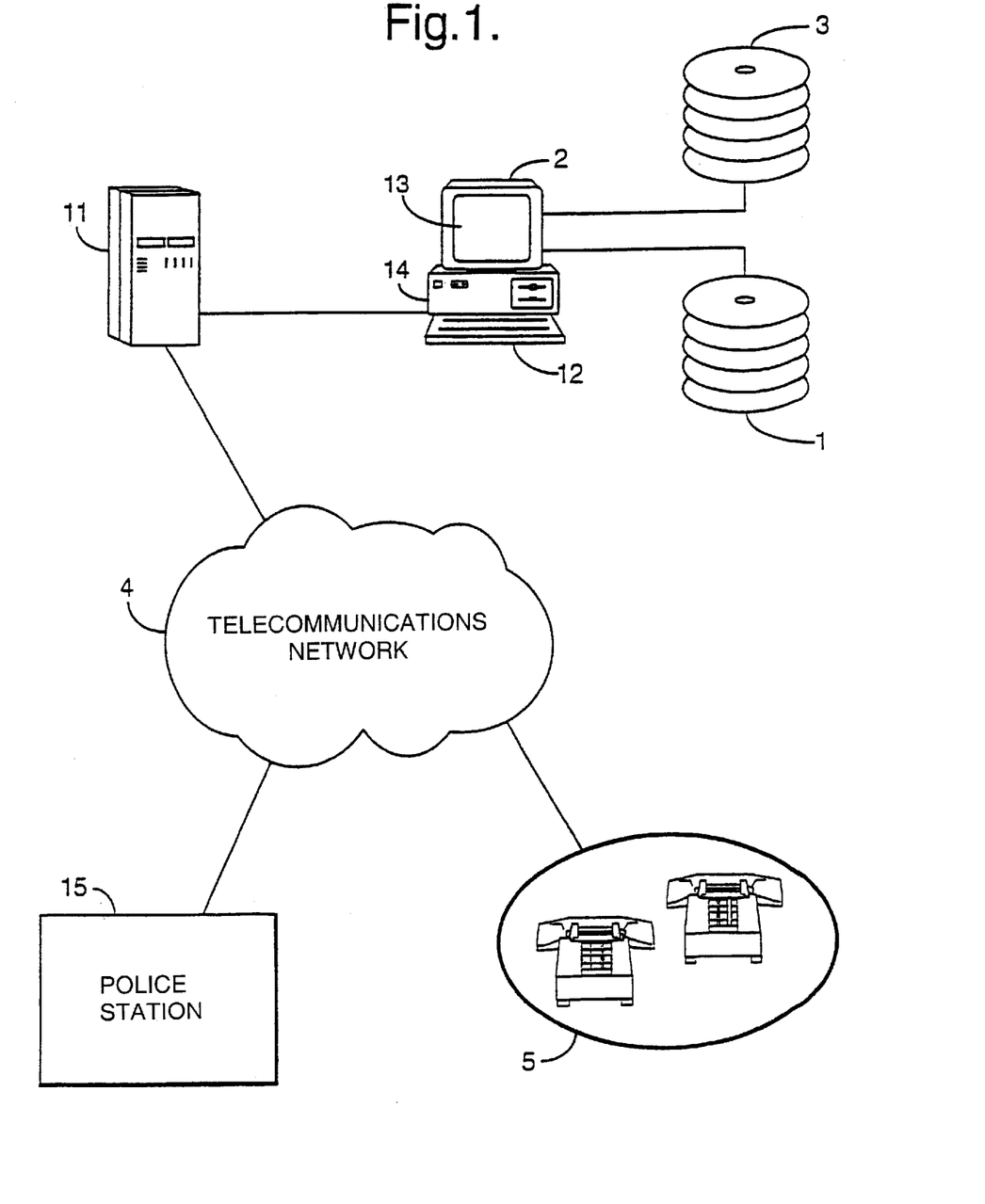
FIG. 1 is a block diagram showing the hardware architecture of the invention.

Referring to FIG. 1, a communications system is shown, whose function is to alert a geographically select set of telephone users to a potential or actual hazard; comprising a digitised map of all areas to be covered by the communications system, stored on a permanent storage medium such as optical disk 1; a Geographic Information System (GIS) 2 comprising an input means 12, a display means 13 and a processor means 14, upon which the digitised map of any selected areas covered by the communications system can be shown; a telephone user database 3; a telecommunications network 4 which is typically a public switched telecommunications network (PSTN); an Interactive Speech Application Platform (ISAP) 11, for automatically dialling telephone numbers and delivering voice information to the telephone receivers 5 of the recipients of the calls, via the telecommunications network 4; and, a police station 15 which may be informed of the findings of the communications system via the telecommunications network 4.

GIS

Figure 2:
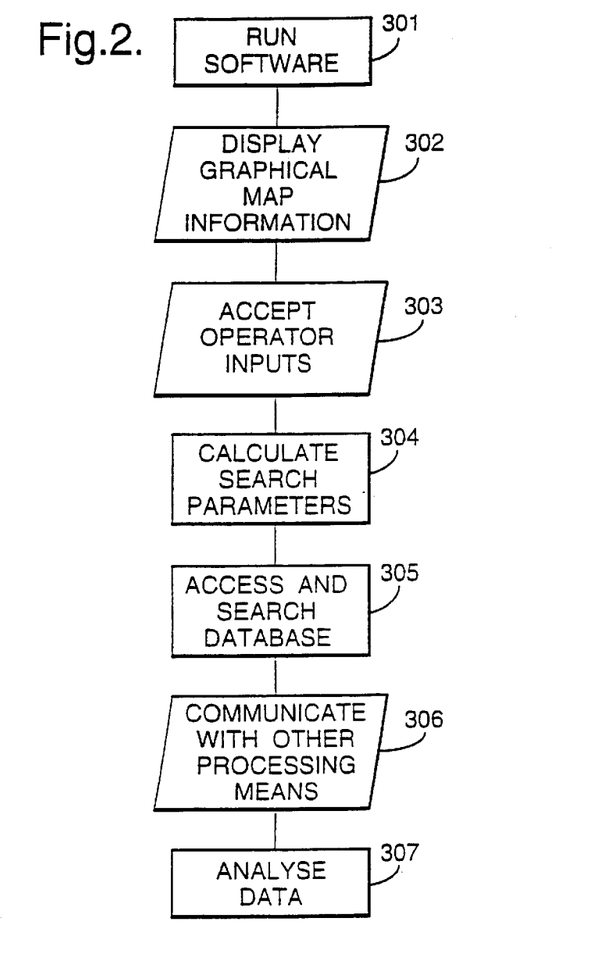
FIG. 2 is a flow diagram showing the sequential functioning of the GIS.

The GIS 2 comprises suitable computer hardware, such as a Pentium based personal computer. Referring to FIG. 2, the sequential functions performed by the GIS 2 comprise running suitable map display software, at step 301, such as is marketed by Mapinfo Corporation, Centennial Court, Bracknell, Berkshire, United Kingdom; displaying graphical map information at step 302; receiving inputs from the operator which are used to manipulate the information displayed and select areas of interest at step 303; calculating search parameters corresponding to the geographical area of interest at step 304; accessing and searching databases for, for example, positional and telephone number information at step 305; communicating with other processing means such as ISAP 11 at step 306; and conducting analysis of various data inputs at step 307.

Digitised Map

A digital map, such as a 1:10,000 or a 1:1,250 scale vector or raster scanned map such as is available from the Ordnance Survey is suitable for this application. The map may be reproduced at multiple required magnification levels, which aids the exact identification of a required area and the features in it, such as buildings. Additionally, it is composed of layers of graphics with associated data layers. Each graphics layer contains a particular type of information; for example, roads, contour lines, hazards such as bridges and pylons, buildings and waterways. An additional layer is used to indicate the language used by the inhabitants of an area, where the communications system covers more than one language region. A selected area shown on the computer screen may have any one or more of its graphics layers selectively removed. This greatly increases the operator's ability to identify the required features.

Associated with each graphics layer is a data layer in which annotations to the graphics are stored. Such annotations may include features such as names of roads, rivers, towns and contour heights. The annotations may be selectively turned on or off by the operator of the GIS 2. Indeed any one data entry may be shown on the screen automatically, in response to the corresponding graphic being selected by the operator, with the GIS input means 12.

Figure 3:
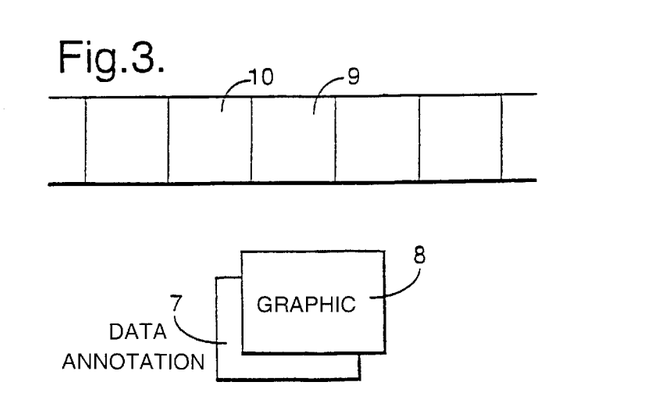
FIG. 3 shows the data and graphics relationship in the GIS 2.

Referring to FIG. 3, this arrangement is illustrated with the memory locations in the GIS 2 for a graphic 8 and its underlying data annotation 7 being represented in memory locations 9 and 10, respectively.

Upon receiving notification of a potential hazard which may affect a particular geographical location, the operator of the GIS 2 is able to highlight each specific area affected by the hazard on the GIS 2 in several ways: firstly, a particular radius from the centre of the hazard may be specified, which may be suitable in the case of bomb scares or earthquakes for example. Secondly, specific streets or individual premises or other graphics such as roads or rivers may be selected. This method of selection may be suitable in the case of siege or terrorist activity or river pollution incidents, for example. Thirdly, the perimeter of the required area may be selected manually using the GIS input means 12.

Once the geographical selection has been defined by the operator, a range of delineating map parameters are derived by the GIS 2 software. These parameters are used to identify each of the telephone users whose location lies within the selected area or areas.

The GIS 2 achieves this by accessing a relational telephone user database 3. Such a database may be based on a database such as Oracle (TM). The telephone user database is, in the UK, compiled under the direction of the UK Home Office and contains details of telephone users throughout the area covered by the communications system. These details comprise at least the telephone number of each user together with information relating each user to an identifiable point in the digital map, typically X and Y map coordinates. Thus the exact location of the premises in which the telephone receiver(s) of each user is located is known.

Figure 4:
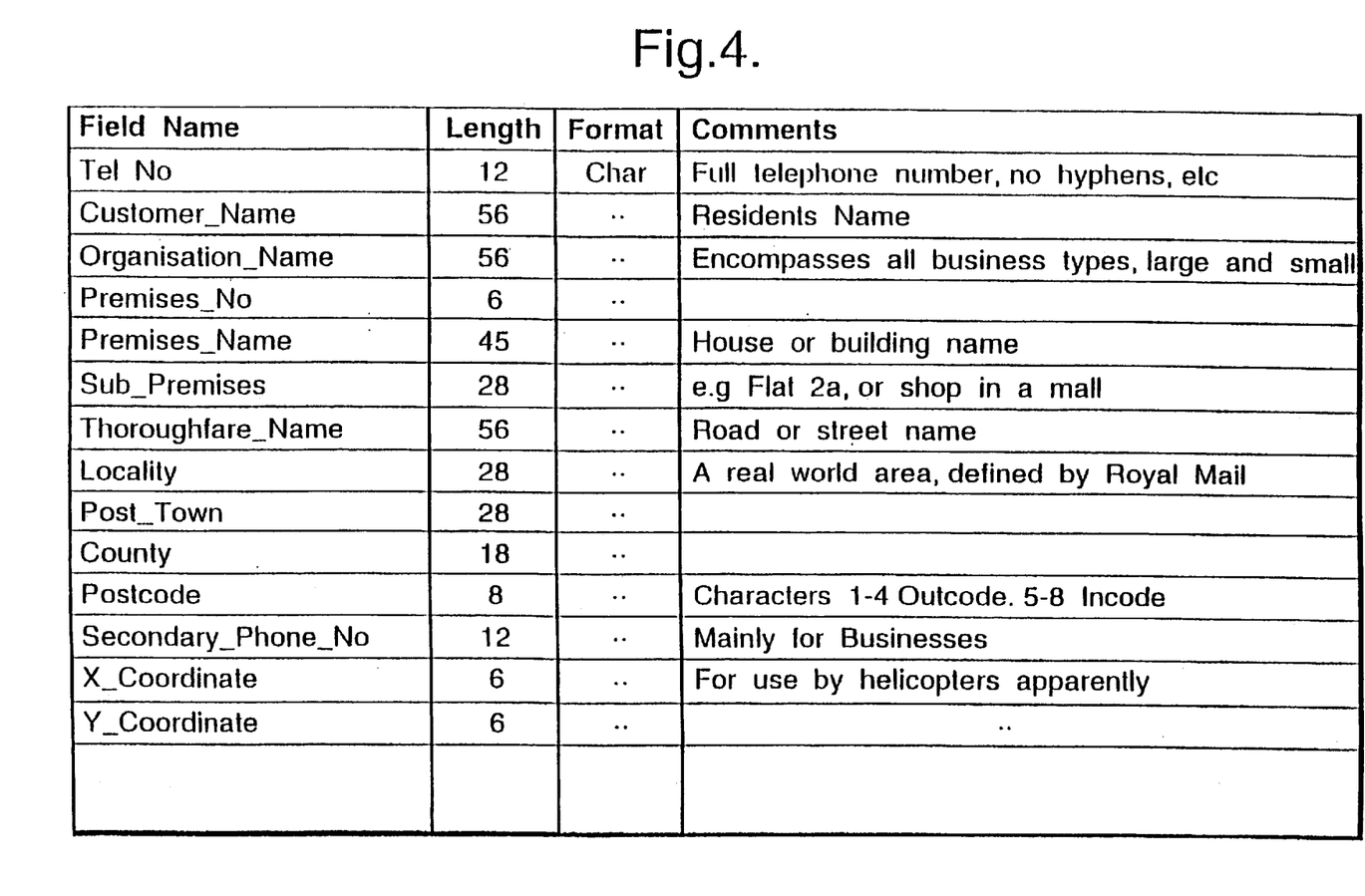
FIG. 4 is an example telephone user record.

In practice however, each telephone number list file contains other fields which are of use in implementing the information system. An example telephone user record is shown in FIG. 4. The other data fields allow the GIS 2 to prioritise the contact list according to those deemed to be at greater risk. For example, all schools in the selected area will be identified in the organisation name field and as such will, in the event of an emergency, be informed of it as a priority.

Once the GIS 2 has completed the database search for telephone user records containing X and Y coordinate values that meet the search parameters, a list of corresponding telephone numbers is extracted. This forms the contact list.

At this stage the contact list may contain numbers which are not necessary to contact, such as public telephones, freephone numbers, chat lines and subsidiary lines. These can be recognised in the UK by their dialling code in the case of freephone numbers and chat lines and hence removed from the list. Public telephone numbers and subsidiary line numbers, can be recognised by searching on further fields in the telephone user records. Such numbers are also deleted. By removing such numbers, the total number of calls that is required to be made is reduced and hence the speed with which information can be disseminated is increased.

The remaining numbers are ordered by the GIS 2, such that those corresponding to the users who should be contacted first are placed first in the contact list. Those people located at the predicted centre of a disaster are generally contacted first. Therefore the GIS 2 calculates the distance between the location of each user and the predicted centre of the disaster and orders the telephone numbers in increasing order of distance.

However, in the case of schools a high priority will be given irrespective of relative distance from the centre of a disaster. This is achieved by searching in the Organisation Name field in the telephone user database for the presence of the word "school".

If the GIS 2 detects any premises in a selected area for which no corresponding telephone user file record can be found, indicating that there is no telephone in the premises, the X, Y coordinates of the premises are automatically supplied to the police 15, via telecommunications network 4. This allows the police to consider paying a precautionary visit to the premises to ensure that people whom cannot be contacted by telephone are safely evacuated in the event of an emergency.

Once a contact telephone list has been generated by the GIS 2 it is transferred to the ISAP 11 as a text file by suitable communication means, such as the internet.

The text file which is transferred also contains information concerning the language in which certain messages are to be delivered. This information is derived by the GIS 2 from the language layer of the digital map.

In the case of a storm in the English channel, for example, warning messages may be delivered in English to those locations situated in the UK whilst similar messages may be delivered in French to those locations situated in France.

The text file may also include other data related to each telephone number which the GIS 2 operator has instructed the GIS 2 to include from the telephone user database. This will normally include the data from the Customer Name field in order to personalise the message which is delivered.

The ISAP 11 performs the warning procedure by automatically dialling each of the numbers on the contact list and delivering in each case a predetermined message.

The ISAP 11 is capable of dialling a series of telephone numbers and generating and relaying speech messages from textual inputs, or, relaying recorded voice messages.

Interactive Speech Application Platform

A full technical description of the ISAP 11 has been given in PCT application WO 93/26113, the contents of which are incorporated herein by reference.

Figure 5:
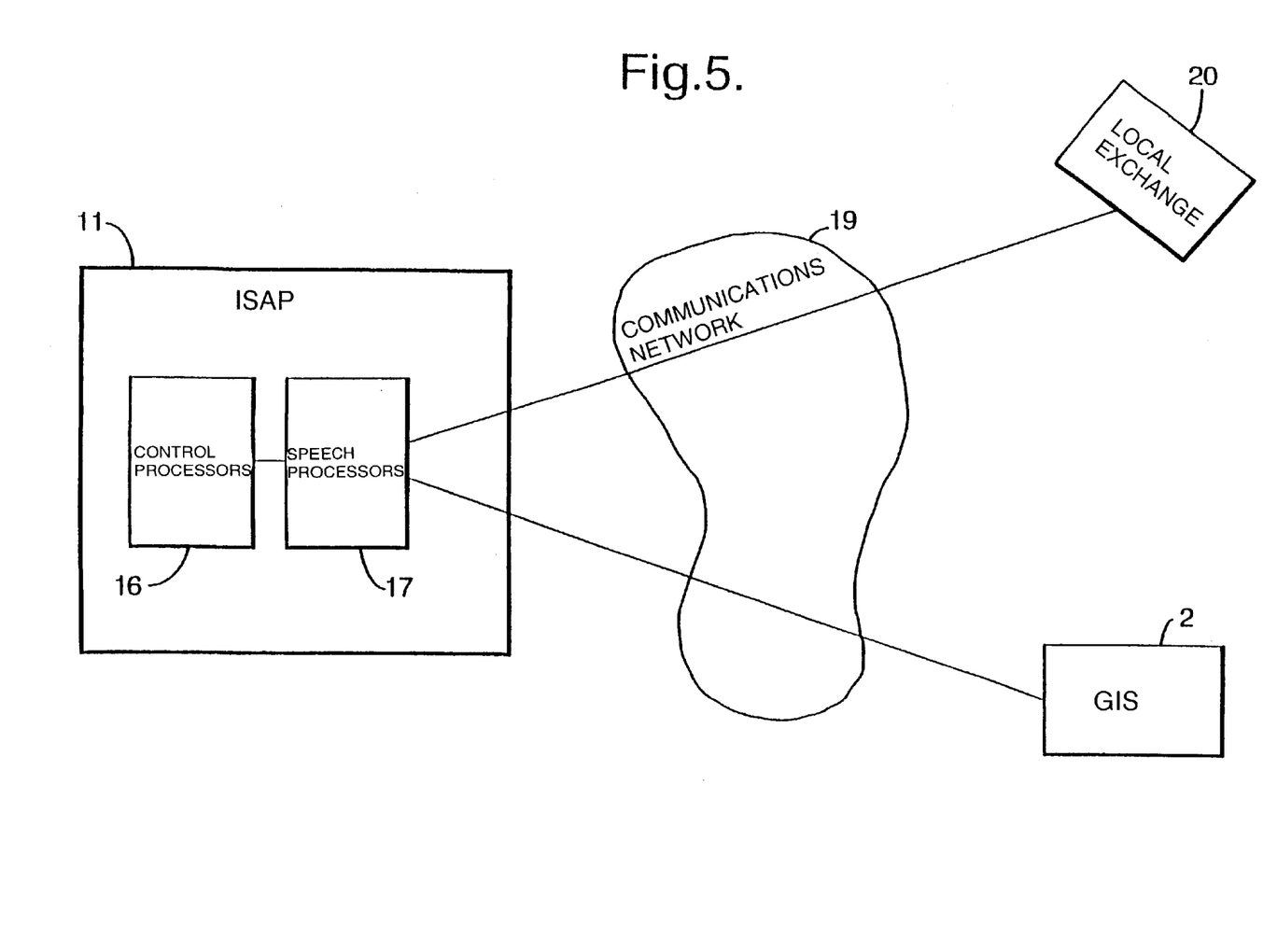
FIG. 5 is a block diagram showing ISAP, GIS, local telephone exchange and associated interconnections.

Referring to FIG. 5 the ISAP 11 comprises a number of processors including control processors 16 and speech processors 17 capable of speech synthesis and speech recognition. An application running on the ISAP 11 requests speech services via the control processors 16, which handle the resource allocation of the speech processors 17. A speech processor 17 contains a general purpose microprocessor, Motorola 68000. These processors run the multitasking operating system, BxWorks, and four digital signal processors, Motorola DSP56000s, linked to the 68000 processor by host port interfaces.

The ISAP 11 resource manager allocates the DSPs and loads the relevant programs into them. As the DSPs have the capacity for running several channels' worth of processing, one DSP may be shared among several applications.

In the current ISAP 11 implementation, this is the Motorola DSP56001.

The ISAP 11 is normally situated remotely from the GIS 2 and it receives a contact list together with appended data in the form of a text file sent via a communications network 19, such as the internet.

The ISAP 11 dials each of the telephone numbers on the list generated by the GIS 2 which are routed via a local exchange 20 and delivers a speech message to the people who answer the calls. In the event that the line is engaged, unanswered or becomes disconnected during the call, the result is logged and the number is requeued to be reattempted at a later point in time. If the number is unobtainable the ISAP 11 logs the result as being unobtainable and the number is not subsequently reattempted.

In the event that the ISAP 11 detects an answering machine on the line, it will deliver the message as normal once it is confirmed that the machine is in recording mode. This is achieved by identifying the tone emitted by the answering machine which signifies the start of the recording mode.

However, in order to maximise the chance of delivering the message directly to the intended telephone user, the telephone number is requeued to be reattempted at a later time.

Due to the interactive nature of the ISAP 11, if the recipient of a message from the ISAP 11 desires more information than that which was given they are given the option of requesting additional information either by voice command or by an appropriate key press of the telephone receiver. This additional information may relate to, for example, the predicted period for which the disaster will last.

The ISAP 11 can be programmed to send differing messages to different locations. For example, a warning message sent to someone at the centre of a predicted national disaster may state simply, "Stay calm and await help", whereas for the same natural disaster the warning message to someone located at the periphery may include details of an evacuation procedure.

The ISAP 11 can also be programmed to include in a standard message selected data items included in the text file transferred from the GIS 2. Such data items are specific to each telephone number in the contact list and will usually include the telephone users' names in order to personalise the call.

In order to avoid the risk of hoaxed warning messages the ringing tone generated by the ISAP 11 is a continuous ring in order that it can be distinguished by the user from normal calls.

Figure 6A:
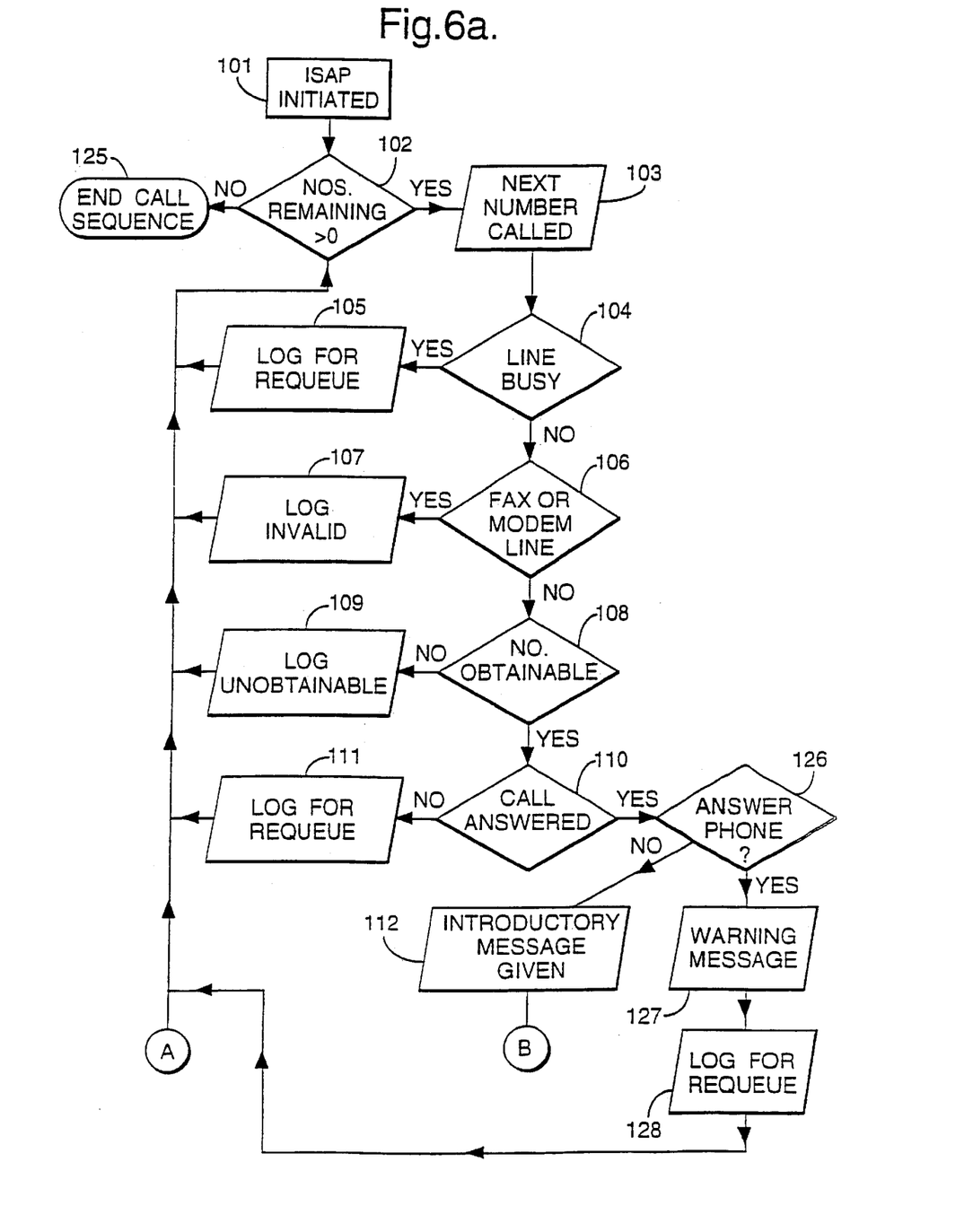
FIGS. 6a and 6b is a flow diagram showing a communication process of ISAP.
Figure 6B:
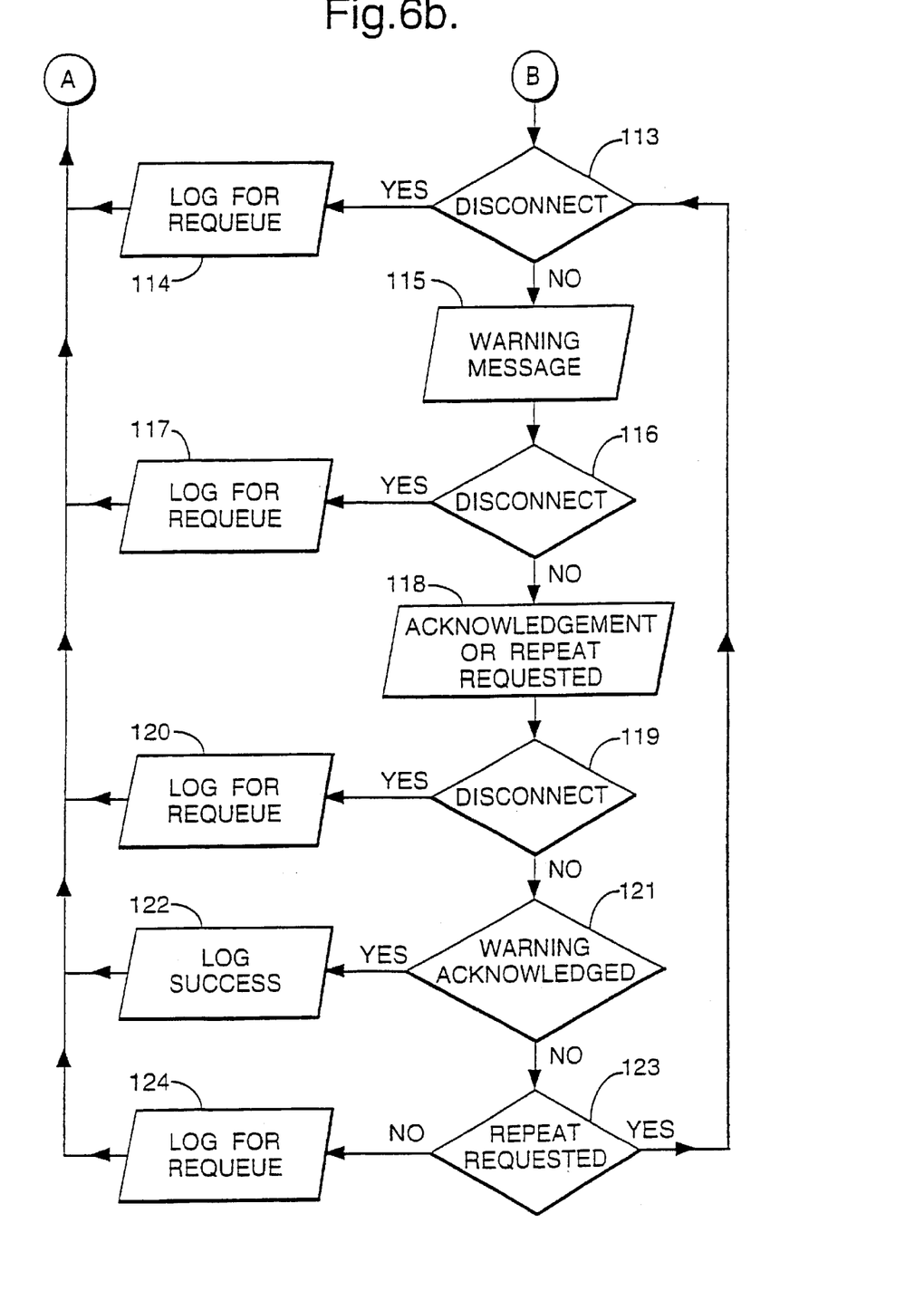

The information process conducted by the ISAP 11 is shown in the flow diagram of FIG. 6a and 6b.

At step 101, the ISAP 11 is initiated. In step 102 the number of remaining numbers to be called is checked. If it is greater than 0, then in step 103 the next number in the contact list is called. In step 104, the line is checked to determine whether it is busy or not. If the line is busy the number is logged for re-queuing in order that it should be redialled at a later point in time, at step 105, and the calling sequence is rejoined at step 102. If the line is not busy, it is checked to be a standard telephone line at step 106. If it is identified as a fax or modem line it is logged as being invalid at step 107, and the calling sequence is rejoined at step 102. Otherwise, the line is verified to be obtainable at step 108. If it is not obtainable, it is logged at such as step 109 and the call sequence is rejoined at step 102. If on the other hand, the number is obtainable the ISAP 11 checks whether the call is answered at step 110. If the call is not answered, then at step 111 it is logged for requeuing and the call sequence is rejoined at step 102.

At step 126 the presence of an answer phone is checked. If it is found that this is the case then a warning message is delivered at step 127. However, to maximise the chances of a successful message delivery the number is requeued at step 128 for redelivery at a later point in time. If the call is not answered by an answer phone then the introductory message is given at step 112.

The ISAP 11 then determines whether the line has been disconnected or not at step 113. If it has been disconnected, the call is logged for requeuing at step 114 and the call sequence is rejoined at step 102. If however, the line has not been disconnected, the message is given at step 115 by the ISAP 11. At step 116 the line is again checked for disconnection. If the line has been disconnected the number is logged for requeuing at step 117 and the call sequence is rejoined at 102. If no disconnection has occurred, the ISAP 11 asks the recipient of the call to acknowledge that he/she has understood the message or request that the message should be repeated at step 118. At step 119 the ISAP 11 again checks that the line has not been disconnected. If a disconnection has occurred then the number is logged for requeuing at 120 and the call sequence is rejoined at step 102.

However if no disconnection has occurred, then if the message is acknowledged at step 121 by the recipient of the call, the ISAP 11 logs the number called as having been successfully received at step 122. The call sequence is rejoined at step 102.

If however no acknowledgement is received, at step 121 the ISAP 11 checks for a request for the message to be repeated at step 123. At both steps 121 and 123 the response from the call recipient may be in the form of a key press on the telephone receiver handset or alternatively a voice command. If no repeat request is detected, then at step 124 the number is logged for requeue after an appropriate delay, for example 20 seconds. The call sequence is then rejoined at step 102. However if a repeat request is detected then the call sequence is rejoined at step 113.

When the number of calls remaining is equal to zero, at step 102, the call sequence ends at step 125.

Second Embodiment

The second embodiment in general terms fulfils the same function as the first embodiment. However, additionally the GIS 2 implements algorithms which are used to predict the effect of the hazard of flooding and airborne hazards.

Flooding

For a given height of flood water an area submerged by the flood water is calculated by the GIS 2 using the contour information in the digital map and displayed graphically using a standard area-fill algorithm.

Alternatively, information from environmental monitoring sources such as the UK Environment Agency which monitors rainfall, river levels, tides and sea conditions and the UK Metrological Office which monitors precipitation through use of weather radar are used to predict changes in local water levels. These estimated changes in local water level are input into the GIS 2 which calculates the land area which will be caused to be submerged for a given rise in water level.

Using a flooding algorithm such as is available from the UK Environment Agency, which determines how the flood water flows with respect to the contour information held in the digitised map, a flood response is calculated to give areas deemed to be at risk.

Airborne Hazards

Airborne type hazards may include gases and particulate matter, such as dust and vapours, as might be released as the result of an industrial accident.

The operator in this case inputs the location of the site of the emission, together with an estimate of how the rate of the emission varied, or is varying, with time. Information concerning the strength and direction of local wind directions are also input. A commercially available "plume generation" algorithm, such as the Atmospheric Dispersion Model (published by the International Atomic Energy Agency ISBN 92-0-623180-4 available from HMSO UK) is used in order to give an estimate of the area in which people may be at risk. This area, as previously described, is displayed upon the digitised map to indicate areas at risk.

In the case of hazards such as flooding and airborne hazards these areas are searched by the GIS 2 for telephone number list files with a location field that satisfies the search parameters as was described in the firs embodiment. The results of this search then form the contact list which corresponds to the premises of telephone users at risk in the affected area.

Third Embodiment

The third embodiment of the invention fulfils in general terms the same functions as the second embodiment. However, in the third embodiment the GIS 2 searches not only for premises which lie in the affected area, as in the first and second embodiments, but also outside the affected area for premises which have been isolated by, for example, a natural disaster. In this embodiment premises which are isolated in such a manner are also deemed to be at risk even if they are not situated in the affected area itself.

For example, a village with only one service road, which is blocked or is likely to be blocked by flooding, is deemed to be at risk as are all of the premises in it.

Fourth Embodiment

The fourth embodiment of the invention fulfils in general terms the same functions as the first through third embodiments. However, once the call sequence of the ISAP 11 has been concluded at step 125 of FIG. 6*a*, the resulting record of the calls made by the ISAP 11 is transferred back to the GIS 2 for analysis.

The GIS 2 can plot the result logged against each telephone number on the contact list, by type, on the digital map.

Therefore the locations of all messages successfully delivered can be viewed by the GIS 2 operator. Similarly, invalid or unobtainable numbers can also be displayed.

The GIS 2 can analyse these results, and using a clustering algorithm can identify the smallest area which contains, for example, 90% of all number which were unobtainable. This information can then be used by the police 15, to whom it is transmitted via a suitable telecommunications network 4, or it can be used to accurately map telephone line failure areas.

Fifth Embodiment

In a fifth embodiment of the invention, the ISAP 11 is used to place test calls to telephone numbers on a contact list generated by the GIS 2, in order to test the integrity of the telecommunications network in a selected area. The calls are placed through the PSTN 4, as described in the first embodiment.

In this embodiment, the area of interest is selected in the GIS 2, and the GIS 2 generates a contact list which is transferred to the ISAP 11 as previously described. This list may be the telephone numbers which the ISAP 11 logged as unobtainable and which were subsequently transmitted back to the GIS 2 in the fourth embodiment, for example. The numbers in the contact list are tested sequentially by the ISAP 11 and the results of these tests are logged. The tests carried out comprise standard cable testing procedures, using capacitative and resistive tests which can be performed from one end only of the line under test.

The distance to a short circuit is determined using a resistive test, given that the resistance per meter of the telecommunications cable is known. Similarly, the distance to an open circuit is determined by the capacitance to earth between the cable pair. Therefore both the distance of short circuits and open circuits from the point of testing, are automatically determined.

The log of call results recorded by the ISAP 11 is automatically fed back to the GIS 2. This allows each premisis with a fault associated with it to be graphically displayed, together with detected fault locations.

This allows the location of a short or open circuit to be determined as being in a particular telephone exchange, a receiver or line.

This means that unobtainable numbers, related by a common fault such as one in a common telephone cable or exchange can quickly be made operational again.

Sixth Embodiment

In the sixth embodiment the ISAP 11 is configured to receive incoming calls from members of the public using standard telephone equipment, concerning the nature and status of a given situation, particularly a crisis or natural disaster.

The caller, upon calling the ISAP 11, receives the option of listening to one of a selection of reports which is selected either by voice command or a key press of the receiver.

Figure 7:
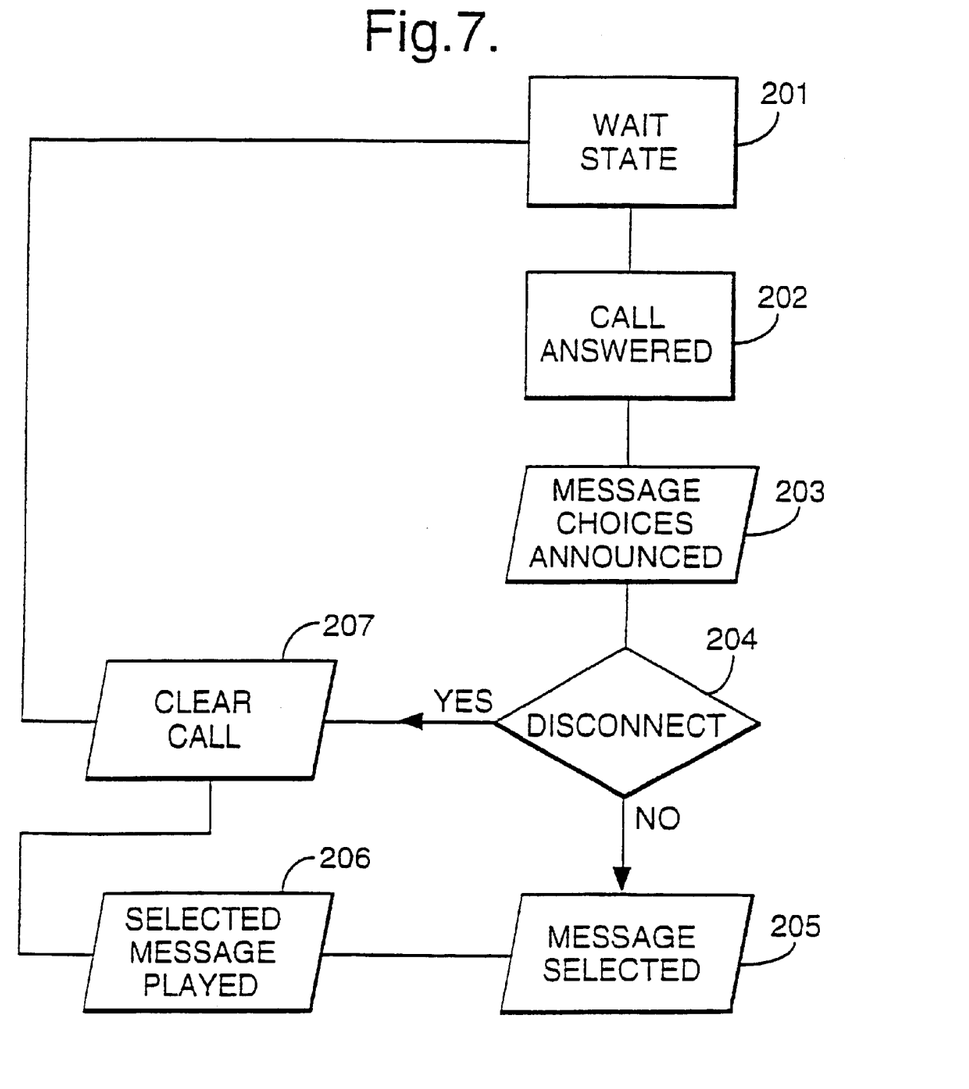
FIG. 7 is a flow diagram showing the dissemination of predetermined messages by ISAP to incoming calls from the public.

Referring to FIG. 7, at step 201, the ISAP 11 is in a wait state, waiting for an incoming enquiry call. At step 202, after an enquiry call has been made, the ISAP 11 answers the call. At step 203 the ISAP 11 announces to the caller the choice of reports from which the caller can select one to listen to. At step 204, the ISAP 11 determines whether the call has been disconnected or not. If the call has been disconnected, the ISAP 11 clears the call at step 207 and returns to the wait state at step 201. If on the other hand, the line has not been disconnected, the caller selects the desired report at step 205 (with the default report being the first one in the list) At step 206, the selected report is played to the caller. At step 207 the call has cleared and a wait state is resumed.

In practice several ISAPs 11 are distributed over a wide area, thus allowing queries concerning emergencies and the like to be re-routed away from the local telephone exchange where the emergency occurred to distant exchanges. This results in the reduction of call loading in the local exchange and hence reduces the likelihood of blockages in the local telephone exchange. This in turn increases the probability of emergency call traffic being able to operate through the local exchange without hinderance.

In the described embodiments the GIS 2 identifies telephone user numbers in a selected geographic area by searching, using the parameters of the selected area, in the location fields of a telephone user database 3. However, the invention can equally be implemented by programming the GIS 2 to search for buildings or residences using the buildings layer of the digital map and associated data layer of the selected geographical area.

For each building or residence found, corresponding geographic locations are calculated or obtained from the associated data layer. The positional information relating to each building or residence is then used to search for a corresponding telephone number in the telephone user database, in order that a contact list may be produced.

In the described embodiments the telecommunications network employed by the invention is a public switched telephone network. However, other telecommunications networks such as an email network or the internet could be used in order to implement the invention. However in the case of email, for example, email addresses will form the contact addresses, as opposed to telephone numbers.

Many other aspects and embodiments of the invention will be apparent to the skilled person from the foregoing. Accordingly, the present invention is not intended to be limited to the above described embodiments but to extend to all modifications thereof which will be apparent to the skilled reader. Protection is sought for any and all novel subject matter and combinations of such subject matter disclosed herein.

What is claimed is:

1. A message distribution system for distributing a message via a telecommunications network to a plurality of telephone terminals, comprising:

a message unit for contacting each of said terminals and sending said message to each;

storage means storing a geographical information database which comprises a plurality of geographical element data linking geographical features of a portion of the Earth with location data which define the position of those features, and dial numbers for a plurality of terminals and associated location data defining the position of said terminals;

input means for allowing input of input location data, comprising a display control device operable to permit a user thereof to freely select an area of a display as said input location data by any one or more of multiple methods all of which are available to the user, the multiple methods comprising permitting the user to enter a central point and radius of said area, permitting the user to select one or more graphics representing geographical features and permitting the user to manually select the perimeter of the area;

area designating means comprising a display device for displaying said geographical features of a portion of the Earth, coupled to said input means and said storage means, for designating a geographical area within said portion of the Earth based on said input location data, and generating a range of delineating map parameters for that area;

terminal derivation means coupled to the store means, for outputting the dial numbers of terminals recorded as being geographically within the area as determined by said delineating map parameters and supplying the numbers for use by the message unit.

2. A message distribution system for distributing a message via a telecommunications network to a plurality of telephone terminals, comprising:

a message unit for contacting each of said terminals and sending said message to each;

store means comprising a geographical information database, storing a plurality of geographical element data linking geographical features of a portion of the Earth with location data which define the position of those features, dial numbers for a plurality of terminals and associated location data defining the position of the terminals;

input means for allowing input of input location data and environmental condition data;

area designation means coupled to the input means and the store means, for designating automatically a geographical area within the portion of the Earth based on the input location data and the environmental condition data, and generating a range of delineating map parameters for that area; and terminal derivation means coupled to the store means, for outputting the dial numbers of terminals recorded as being geographically within the area as determined by the generated range of delineating map parameters and supplying the numbers for use by the message unit.

3. A system according to claim 2 in which the environmental condition data comprises data relating to a water level.

4. A system according to claim 2 in which the environmental condition data comprises data relating to wind conditions.

5. A system according to claim 2 wherein the supplied dial numbers form a list of dial numbers, at least one of the dial numbers being removed from the list prior to dialing.

6. A system according to claim 5 wherein the at least one dial number removed from the list corresponds to the number of a public telephone.

7. A message distribution system for distributing a message via a telecommunications network to a plurality of communications terminals, comprising:

a message unit for contacting each of said terminals and sending said message to each;

storage means storing a geographical information database which comprises a plurality of geographical element data linking geographical features of a portion of the Earth with location data which define the position of those features, and contact addresses for a plurality of terminals and associated location data defining the position of said terminals;

input means for allowing input of input location data, comprising a display control device operable to permit a user thereof to freely select an area of a display as said input location data by any one or more of multiple methods all of which are available to the user, the multiple methods comprising permitting the user to enter a central point and radius of said area, permitting the user to select one or more graphics representing geographical features and permitting the user to manually select the perimeter of the area;

area designating means comprising a display device for displaying said geographical features of a portion of the Earth, coupled to said input means and said storage means, for designating a geographical area within said portion of the Earth based on said input location data, and generating a range of delineating map parameters for that area; and terminal derivation means coupled to the storage means, for outputting the respective contact addresses of terminals recorded as being located within the area as determined by said delineating map parameters and supplying the contact addresses for use by the message unit.

8. A message distribution system for distributing a message via a telecommunications network to a plurality of communications terminals, comprising:

a message unit for contacting each of said terminals and sending said message to each;

storage means storing a geographical information database which comprises a plurality of geographical element data linking geographical features of a portion of the Earth with location data which define the position of those features, and contact addresses for a plurality of terminals and associated location data defining the position of said terminals;

input means for allowing input of input location data and environmental condition data;

area designating means coupled to the input means and the storage means, for designating automatically a geographical area within the portion of the Earth based on the input location data and the environmental condition data, and generating a range of delineating map parameters for that area; and terminal derivation means coupled to the storage means, for outputting the respective contact addresses of terminals recorded as being located within the area as determined by the generated range of delineating map parameters and supplying the contact addresses for use by the message unit.

9. A system according to claim 7 or 8 in which the environmental condition data comprises data relating to a water level.

10. A system according to claim 7 or 8 in which the environmental condition data relates to wind conditions.

11. A system according to claim 7 or 8 in which the message relates to an emergency condition.

12. A system according to claim 7 or 8 further comprising a message generator for generating a text message and a text to speech synthesizer for converting said text message into a synthesized speech message for transmission through said telecommunications network.

13. A system according to claim 7 or 8 in which the message transmitted to each terminal comprises a common message component common to all said terminals and a specific message component selected for each terminal in dependence upon data stored in relation to that terminal.

14. A system according to claim 7 or 8 in which the terminal derivation means is arranged to output the contact addresses in an order related to the geographical positions of the terminals within said area.

15. A system according to claim 14 in which said order specifies that the message unit will communicate with the innermost terminals within said area before the outermost said terminals within said area.

16. A system according to claim 7 or 8 further comprising means for determining whether said message has successfully been delivered to a said terminal.

17. A system according to claim 16 in which the determining means is arranged to accept, from said telecommunications network, an acknowledgement signal from the user of said terminal.

18. A system according to claim 16, further comprising means for initiating a line test of the portion of the telecommunications network connected to said communications terminal.

19. A system according to claim 16, further comprising analysis means for analyzing the success of delivery to said terminals.

20. A system according to claim 19 in which the analysis means is arranged to analyse the geographical distribution of terminals to which delivery was unsuccessful.

21. A system according to claim 19, in which the locations of the terminals to which delivery was unsuccessful are displayed on said display device.

22. A system according to claim 7 or 8 wherein said geographical element data represent buildings.

23. A system according to claim 22, comprising means for coupling a list of contact addresses output by the terminal derivation means and selectively removing those contact addresses which do not correspond to inhabited premises from said list.

24. A system according to claim 7 or 8 comprising means for ordering said contact addresses output by the terminal derivation means by the relative distances of said related stored data elements to the centre of said geographic area.

25. A system according to claim 7 or 8 in which said geographic area corresponds to an area where inhabitants may be at risk.

26. A system according to claim 7 or 8 in which said stored data elements are selected by defining an area in which inhabitants are to be contacted.

27. A system according to claim 7 or 8 further arranged to contact each said contact address and relay predetermined information.

28. A system according to claim 27, in which each said contact address is reattempted at a later point in time if said information is not successfully relayed.

29. A system according to claim 27, in which said information comprises a recorded voice message.

30. A system according to claim 27, in which said information comprises a textual message which is converted into a synthesised voice message.

31. A system according to claim 27, wherein each said contact address is scheduled and handled individually.

32. A system according to claim 7 or 8 comprising further database means for storing additional data items specific to each said user wherein each call includes at least one said additional data item.

33. A system according to claim 7 or 8, wherein the communications terminals are telephones and the contact addresses are dial numbers.

34. A method of distributing a message via a telecommunications network to a plurality of communications terminals, comprising:

contacting each of said terminals and sending said message to each;

storing a geographical information database which comprises a plurality of geographical element data linking geographical features of a portion of the Earth with location data which define the position of those features, and contact addresses for a plurality of terminals and associated location data defining the position of said terminals;

allowing input of input location data, including permitting a user thereof to freely select an area of a display as said input location data by any one or more of multiple methods all of which are available to the user, the multiple methods comprising permitting the user to enter a central point and radius of said area, permitting the user to select one or more graphics representing geographical features and permitting the user to manually select the perimeter of the area;

displaying on a display device said geographical features of a portion of the Earth, designating a geographical area within said portion of the Earth based on said input location data, and generating a range of delineating map parameters for that area; and outputting the respective contact addresses of terminals recorded as being located within the geographic area as determined by the delineating map parameters and supplying the contact addresses for use by the message unit.

35. A method of distributing a message via a telecommunications network to a plurality of communications terminals, comprising:

contacting each of said terminals and sending said message to each;

storing a geographical information database which comprises a plurality of geographical element data linking geographical features of a portion of the Earth with location data which define the position of those features, and contact addresses for a plurality of terminals and associated location data defining the position of said terminals;

receiving input of input location data and environmental condition data;

designating automatically a geographical area within the portion of the Earth based on the input location data and the environmental condition data, and generating a range of delineating map parameters for that area; and outputting the respective contact addresses of terminals recorded as being located within the area as determined by the generated range of delineating map parameters and supplying the contact addresses for use by the message unit.

36. A method according to claim 35 in which the environmental condition data comprises data relating to a water level.

37. A method according to claim 35 in which the environmental condition data comprises data relating to wind conditions.

38. A method according to claim 35 wherein the recorded contact addresses form a list of contact addresses, at least one of the contact addresses being removed from the list prior to being contacted.

39. A method according to claim 38 wherein the at least one contact address removed from the list corresponds to the contact address of a public telephone.

* * * * *